(12) United States Patent
Huang et al.

(10) Patent No.: US 9,544,474 B1
(45) Date of Patent: Jan. 10, 2017

(54) VIDEO FRAME TRANSMITTING SYSTEM AND VIDEO FRAME TRANSMITTING METHOD

(71) Applicant: MEDIATEK INC., Hsin-Chu (TW)

(72) Inventors: Ta-Lun Huang, Hsinchu (TW); Chun-Wei Ku, Hsinchu (TW); Chen-Long Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 15 days.

(21) Appl. No.: 14/753,014

(22) Filed: Jun. 29, 2015

(51) Int. Cl.
*H04N 5/04* (2006.01)
*H04N 5/38* (2006.01)
*G06F 3/041* (2006.01)

(52) U.S. Cl.
CPC ............... *H04N 5/04* (2013.01); *G06F 3/041* (2013.01); *H04N 5/38* (2013.01)

(58) Field of Classification Search
CPC ............ H04N 5/38; H04N 5/006; H04N 5/05; H04N 5/04; H04N 21/235; H04N 21/4307; H04N 13/0497; G06F 3/041; G06F 1/3265; G09G 5/12; G09G 5/18
USPC ......... 348/500, 723, 725, 553–555; 345/204, 345/533, 534

IPC ................................................. H04N 5/04,5/38
See application file for complete search history.

(56) References Cited

U.S. PATENT DOCUMENTS 9,318,072 B2 * 4/2016 Cha ...................... G06F 1/3265
2013/0314454 A1 * 11/2013 Jin ....................... G09G 3/3406
345/690

* cited by examiner

*Primary Examiner* — Sherrie Hsia
(74) *Attorney, Agent, or Firm* — Han IP Corporation; Andy M. Han (57) ABSTRACT

A video frame transmitting system transmitting at least one output video frame to a display based on content of at least one input video frame. The video frame transmitting system has a display driver receiving an active input video frame and outputting the active input video frame as the output video frame to the display. The video frame transmitting system comprises: an application processor, receiving the input video frame, for determining the input video frame as the active input video frame if the content of the input video frame is different from content of a previous input video frame, and for determining the input video frame as a skip input video frame if the content of the input video frame is the same as the content of the previous input video frame. The application processor outputs the active input video frame to the display driver but does not output the skip input video frame.

16 Claims, 8 Drawing Sheets

VIDEO FRAME TRANSMITTING SYSTEM AND VIDEO FRAME TRANSMITTING METHOD

BACKGROUND

The present application relates to a video frame transmitting system and a video frame transmitting method, and particularly relates to a video frame transmitting system and a video frame transmitting method that can skip transmitting at least one video frame without a video frame buffer.

A related video displaying system usually comprises an application processor and a display driver. The application processor (ex. a processing unit) receives input video frames and transmits the input video frames to the display driver. The display driver receives input video frames from the application processor and writes the input video frame to each line of the display. The display driver can control the displaying operation of the display as well.

Figure 1:
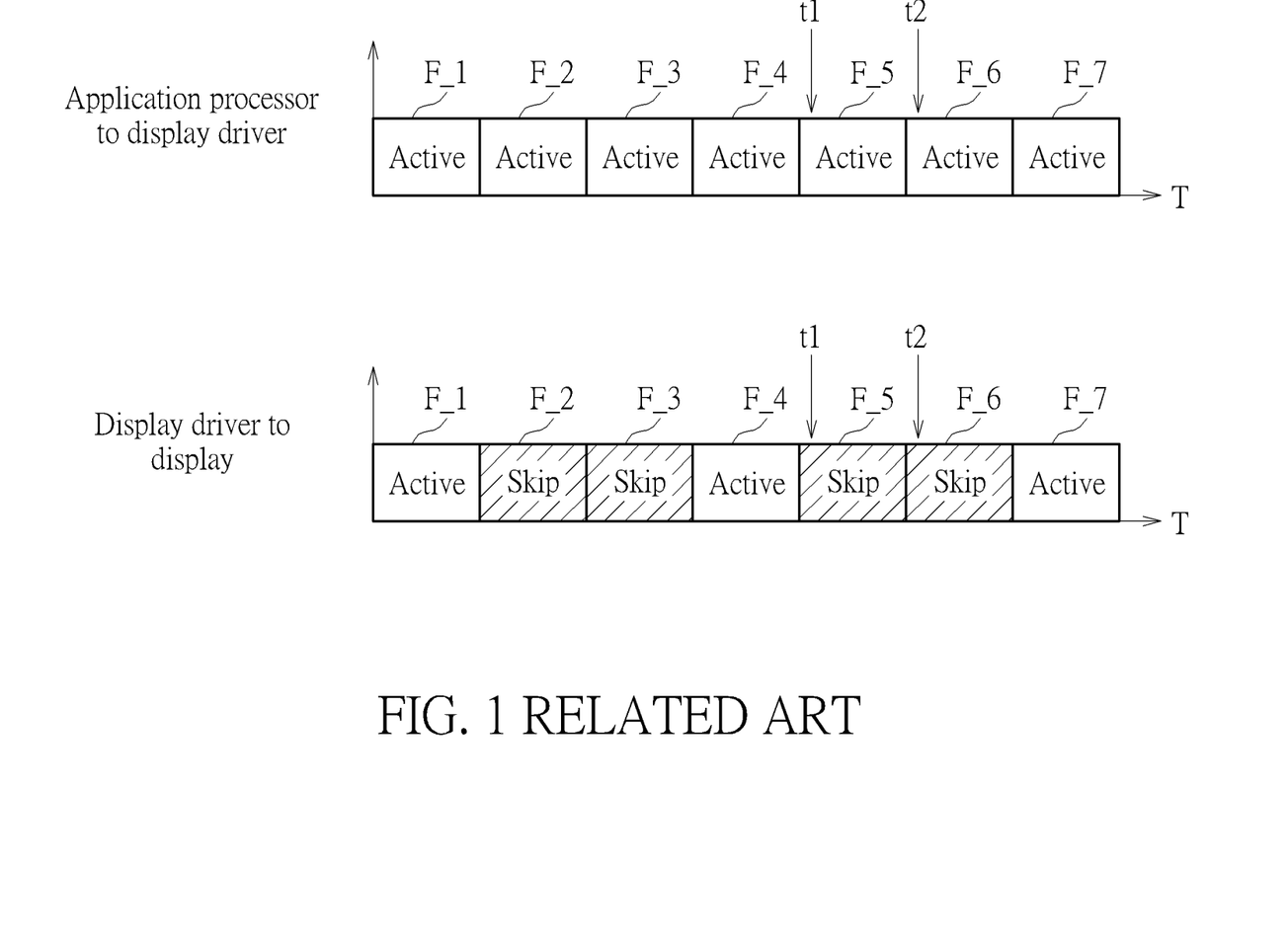
FIG. 1 is a schematic diagram illustrating related art video frame transmitting methods.

FIG. 1 is a schematic diagram illustrating related art video frame transmitting methods. As shown in FIG. 1, the application processor transmits every video frame to the display driver (i.e. all video frames F_1-F_n are treated as active input video frames). However, the display driver may only transmit part of the input video frames to the display (ex. only video frames F_1, F_4, and F_7). Therefore, the application processor wastes much power to transmit video frames which will be skipped later.

Also, if such video frame transmitting method is applied to a touch control apparatus with a touch control panel (ex. a smart phone), the user may perceive a delay issue for the display. For more detail, if the user touches the touch control panel at a time point t1, and content of the video frame F_6 is correspondingly different from content of the video frame F_5 at a time point t2. However, the video frame F_6 is still skipped by the display driver and not displayed on the display. Therefore, the applicant may feel the displaying operation is delayed. Such delay issue becomes worse if the video frame rate is low.

Furthermore, if the video frame transmitting method follows a MIPI (Mobile Industry Processor Interface) standard, a video frame buffer must be included in the video displaying system to skip the video frame. For more detail, the input video frames from the application processor are registered in the video frame buffer, and the video frames are fetched from the video frame buffer and transmitted to the display when the video frames are active input video frames. Such structure increases the size and cost of the video frame transmitting system.

SUMMARY

Therefore, one objective of the present application is to provide a video frame transmitting system and a video frame transmitting method that can control the application processor to skip video frames without a video frame buffer.

Therefore, one objective of the present application is to provide a video frame transmitting system and a video frame transmitting method that can reduce the delay issue for the display.

One embodiment of the present application discloses a video frame transmitting system for transmitting at least one output video frame to a display based on content of at least one input video frame. The video frame transmitting system comprises a display driver for receiving an active input video frame and for outputting the active input video frame as the output video frame to the display. The video frame transmitting system comprises: an application processor, receiving at least one input video frame, for determining the input video frame as the active input video frame if the content of the input video frame is different from content of a previous input video frame, and for determining the input video frame as a skip input video frame if the content of the input video frame is the same as the content of the previous input video frame. The application processor outputs the active input video frame to the display driver but does not output the skip input video frame.

Another embodiment of the present application discloses a video frame transmitting method for transmitting at least one output video frame to a display based on content of at least one input video frame. The display receives the output video frame from a display driver. The display driver receives an active input video frame and outputs the active input video frame as the output video frame. The video frame transmitting method comprises: receiving the input video frame via an application processor, determining the input video frame as the active input video frame if the content of the input video frame is different from content of a previous input video frame, and determining the input video frame as a skip input video frame if the content of the input video frame is the same as the content of the previous input video frame; and outputting the active input video frame from the application processor to the display driver but not outputting the skip input video frame from the application processor.

In view of above-mentioned embodiments, the application processor can skip video frames without a video frame buffer. Also, the delay issue for the display can be reduced, if an input video frame has different content from the content of a previous frame corresponding to the touch is determined as an active input video frame.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
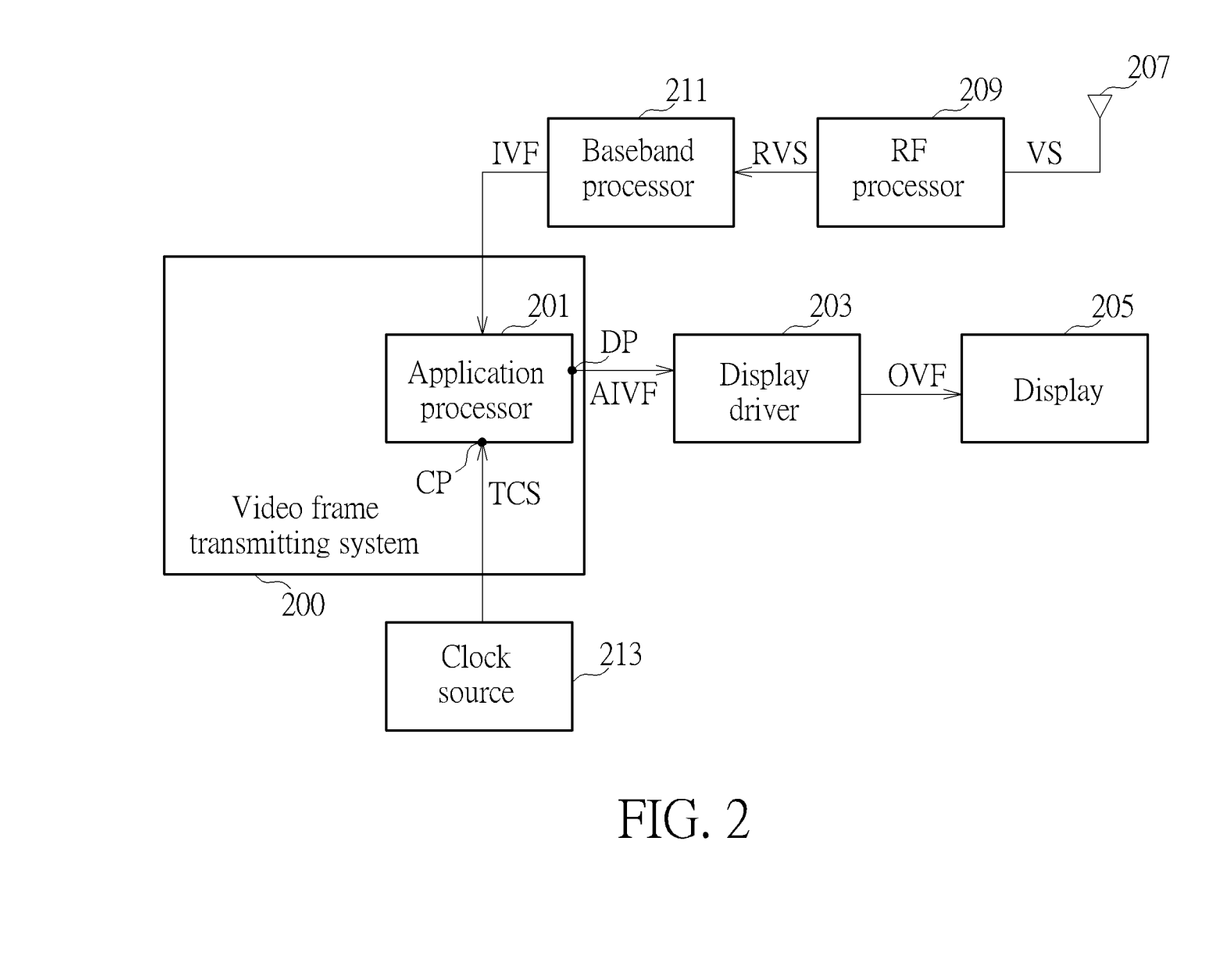
FIG. 2 is a block diagram illustrating a video frame transmitting system applying a video frame transmitting method according to one embodiment of the present application.

FIG. 2 is a block diagram illustrating a video frame transmitting system 200 applying a video frame transmitting method according to one embodiment of the present application. In the following embodiment, video frame transmitting system 200 is based on the MIPI standard. However, it is for illustrative purpose only, but not a limitation. As shown in FIG. 2, the video frame transmitting system 200 may comprise an application processor 201. The application processor 201, which can be a processing unit or any other device, may receive at least one input video frame IVF. The application processor 201 may determine the input video frame IVF as an active input video frame if the content of the input video frame IVF is different from the content of a previous input video frame. Further, the application processor 201 may determine the input video frame IVF as a skip input video frame if the content of the input video frame is the same as the content of a previous input video frame.

Many methods can be applied to determine if the content of the input video frame is different from the content of the previous input video frame or not. For example, if the content of the input video frame is different from the content of the previous input video frame, some indicating data of the input video frame correspondingly changes, such that the application processor 201 can know the content of the input video frame is different from the content of the previous input video frame. In one embodiment, software executed by the application processor 201 may get the information that the content of the input video frame is different from the content of the previous input video frame, thus can inform other devices of such information.

The application processor 201 may output the active input video frame AIVF to a display driver 203, but does not output the skip input video frame. The display driver 203 may receive the active input video frame AIVF from the application processor 201, control the display 205, and output the active input video frame AIVF as the output video frame OVF to the display 205.

The input video frame IVF can come from various kinds of video sources. In one embodiment, the video frame transmitting system 200 is applied to a mobile electronic device, thus the input video frame IVF can be from a baseband processor 211. For more detail, the antenna 207 may receive the video signal VS via wireless transmission. The RF processor 209 may receive the video signal VS and convert it to a RF video signal RVS. Additionally, the baseband processor 211 may convert the RF video signal RVS to the input video frame IVF. However, it does not mean to limit that the input video frame IVF is from the baseband processor 211.

Besides, in one embodiment the application processor 201 may output the active input video frame AIVF at a data pin DP, which can be a single ended pin or a differential pin. Also, the application processor 201 may receive a transmitting clock signal TCS via a clock pin CP and transmits the active input video frame AIVF based on the transmitting clock signal TCS. The transmitting clock signal TCS can be generated from a clock source 213 (ex. an oscillator). However, the clock source is not limited to locate outside the video frame transmitting system 200.

Please note, in the above-mentioned embodiment, the video frame transmitting system 200 excludes the display driver 203. However, in another embodiment, the display driver 203 is included in the video frame transmitting system 200.

FIG. 3 to FIG. 6 are schematic diagrams illustrating the video frame transmitting method according to one embodiment of the present application. As mentioned above, the application processor 201 may output the active input video frame AIVF to the display driver 203, but may not output the skip input video frame. For more detail, the application processor 201 may output the active input video frame AIVF in at least one corresponding active time period marked T_A in the following embodiments, and may not output the skip input video frame in at least one corresponding skip time period marked T_S in the following embodiments. In one embodiment, a length of the skip time period T_S may be equal to a length of a time period for transmitting an input video frame.

Figure 3:
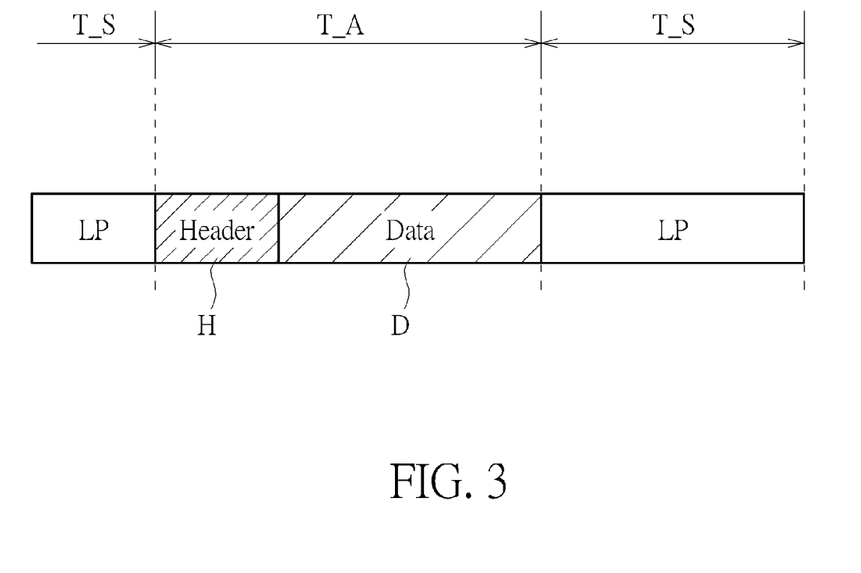
FIG. 3 to FIG. 6 are schematic diagrams illustrating the detail about transmitting active input video frames based on the video frame transmitting method according to one embodiment of the present application.

As shown in FIG. 3, the application processor 201 may output the active input video frame in the active time period T_A and may not output the skip input video frame in the skip time period T_S. In one embodiment, the active input video frame may be transmitted in a packet format. In one embodiment, the packets for the active input video frame can be classified to a header packet group H and a data packet group D. However, it is for illustrative purpose only, but not a limitation. The header packet group H can comprise at least one header packet for synchronization between the application processor and the display driver. Besides, the data packet group D can comprise at least one data packet comprising image data for the input video frame.

In the skip time period T_S, the application processor 201 may not output the skip input video frame and may keep the data pin DP, the clock pin CP at a predetermined voltage level, which is marked LP. In other embodiments, the application processor 201 can further provide sync packets in the skip time period T_S.

Figure 4:
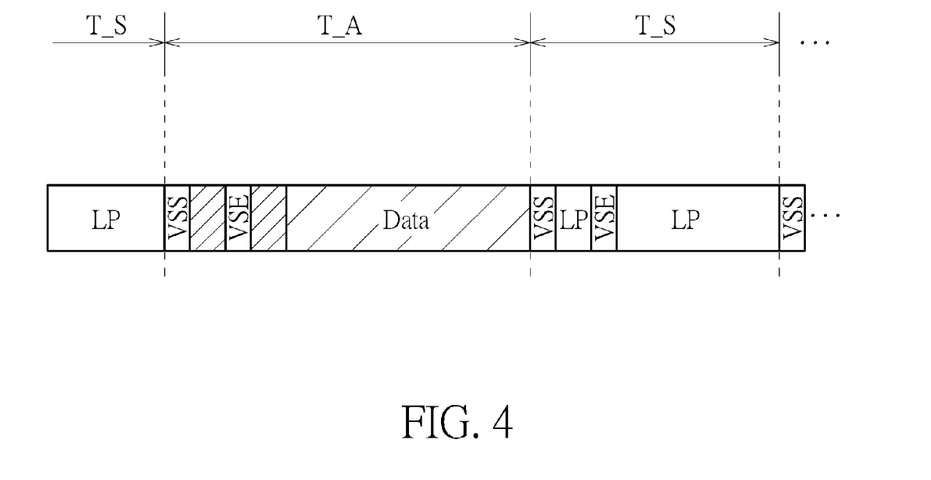

As shown in FIG. 4, the application processor 201 may further generate at least one vertical sync packet (ex. VSS and VSE) indicating start timing of the skip time period T_S to the display driver, for at least one of the skip time period T_S. In other time periods that the vertical sync packets are not provided, which are marked by LP, the application processor 201 may keep the data pin DP, the clock pin CP at the predetermined voltage level. As mentioned above, the vertical sync packet can indicate start timing of the skip time period T_S, thus the display driver can synchronize with the application processor according to the vertical sync packet. In one embodiment, the application processor 201 may further generate the vertical sync packet in the active time period, as shown in FIG. 4.

Figure 5:
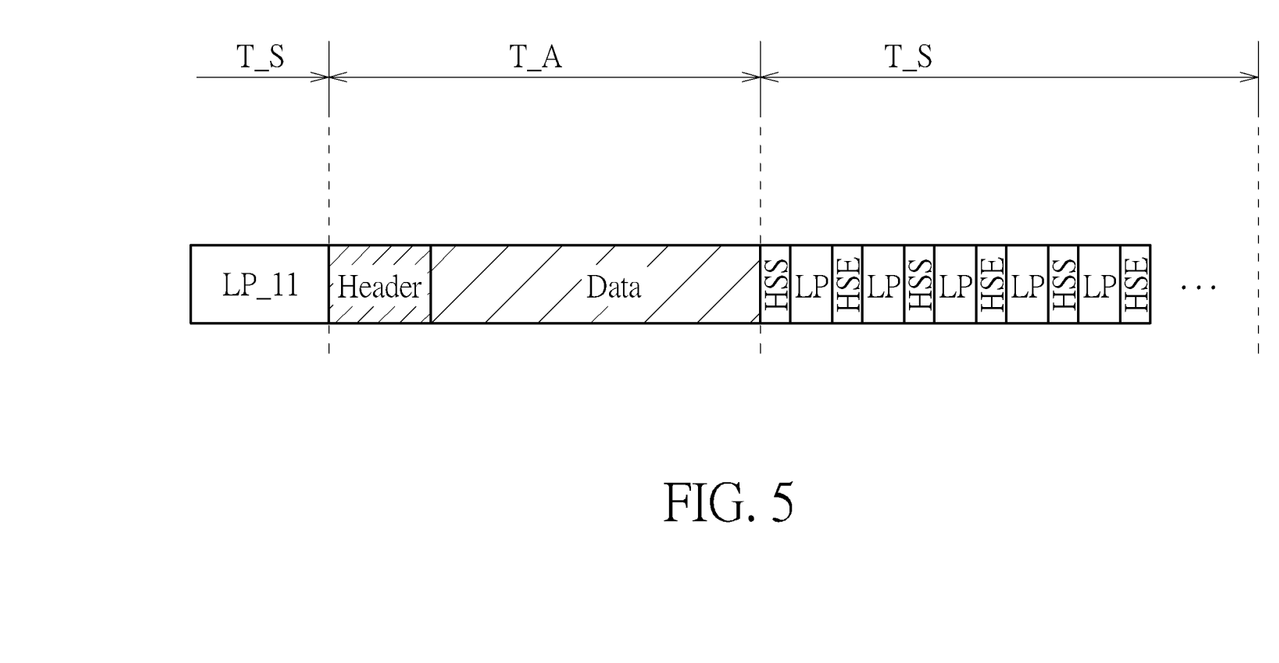

The application processor 201 can provide other kinds of sync packets for synchronization. As shown in FIG. 5, the application processor 201 may generate at least one horizontal sync packet (ex. HSS, HSE) indicating each line (ex. row or column) of the skip input video frame to the display driver 203, for the at least one skip time period T_S. As mentioned above, the horizontal sync packet(s) HSS and HSE may indicate each line of the skip input video frame, thus the display driver can synchronize with the application processor according to the horizontal sync packet(s). In one embodiment, the application processor 201 may further generate the horizontal sync packet in the active time period, but not illustrated in FIG. 5.

Figure 6:
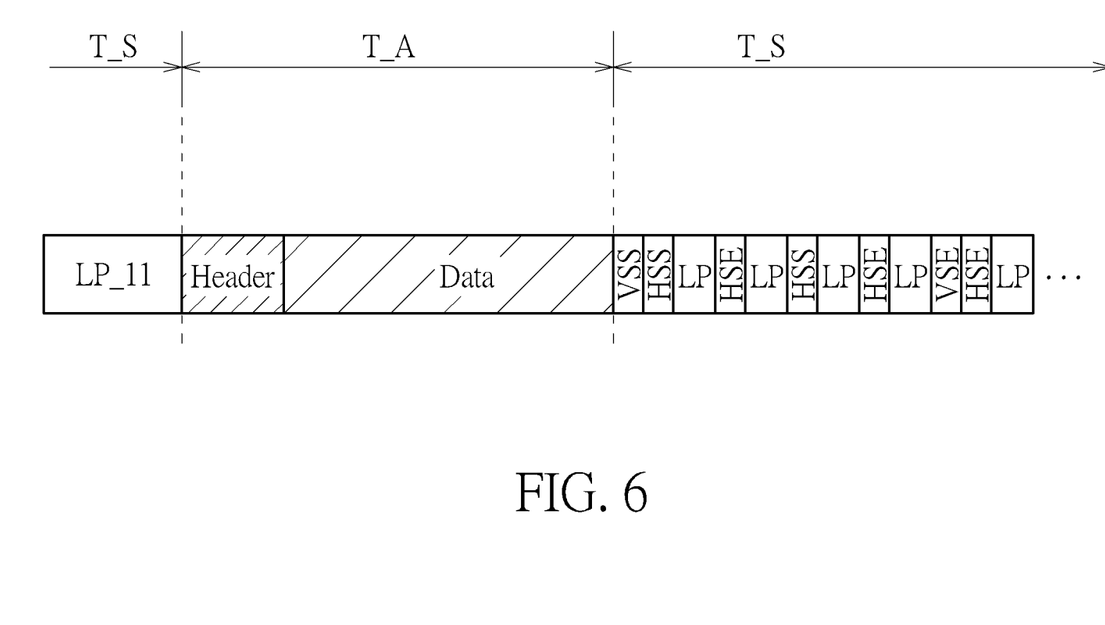

The application processor 201 can provide both the vertical sync packet and the horizontal sync packet in the skip time period T_S, as shown in FIG. 6. The application processor 201 can provide both the vertical sync packet and the horizontal sync packet in the active time period T_A, but not illustrated for brevity here.

As mentioned above, the video frame transmitting system illustrated in FIG. 2 and the video frame transmitting method described above can base on the MIPI standard. The MIPI standard comprises two modes: the command mode and the video mode. In the command mode, the application processor transmits input video frames to a video frame buffer and the input video frames are stored in the video frame buffer. The display driver fetches the input video frame from the video frame buffer and transmits to the display when the input video frames are needed. In the video mode, the application processor continuously transmits data to the display driver, the display driver continuously transmits data to the display, and no video frame buffer is needed. The above-mentioned embodiments can be regarded as a modified video mode since no video frame buffer is needed, and the applicant processor 201 may continuously transmit data (ex. sync packets) to the display driver.

Figure 7:
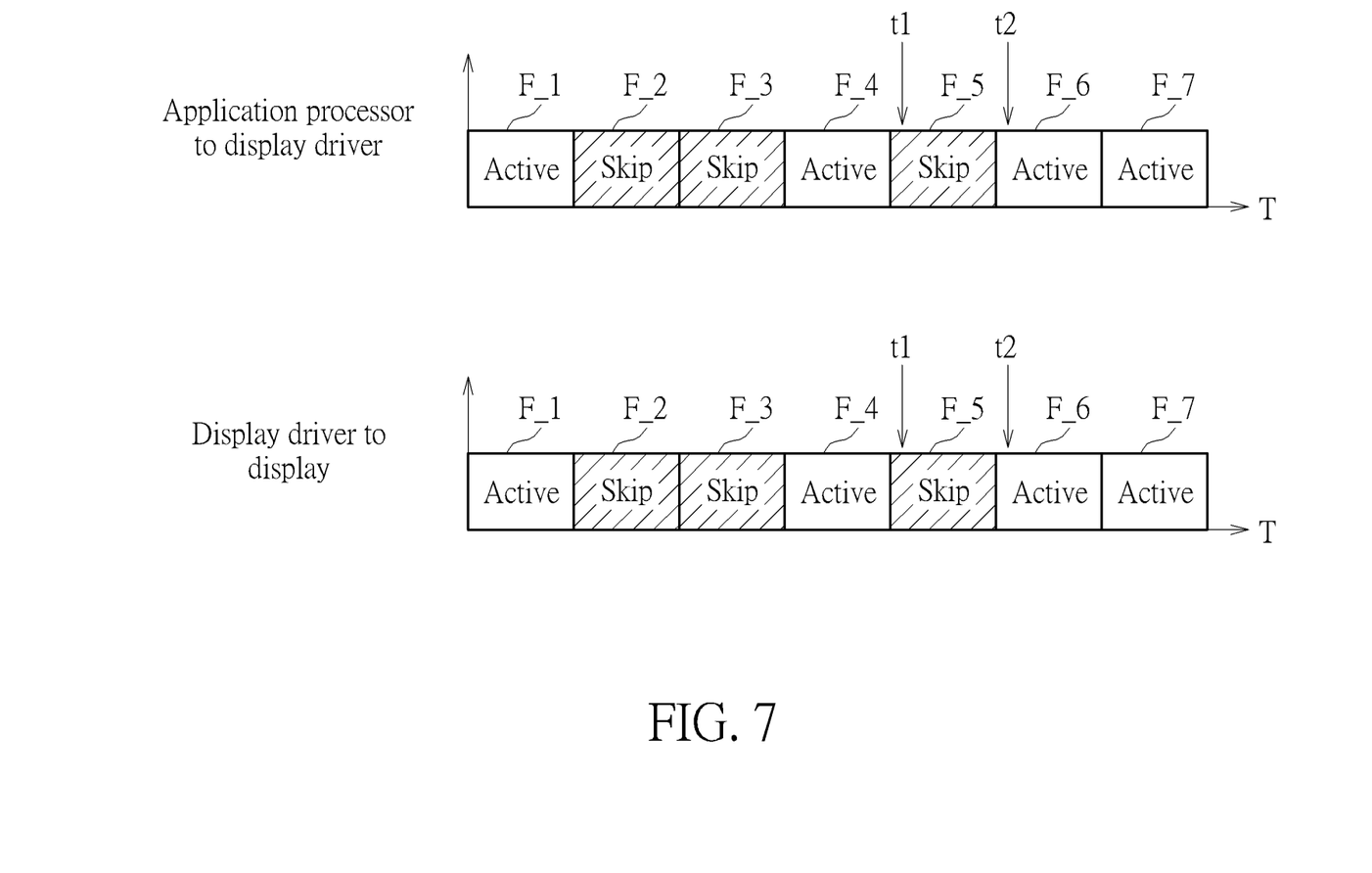
FIG. 7 is a schematic diagram illustrating the video frame transmitting method according to one embodiment of the present application.

FIG. 7 is a schematic diagram illustrating the video frame transmitting method according to one embodiment of the present application. As illustrated in FIG. 7, the application processor 201 can output only the active input video frames F_1, F_4, F_6, F_7 and skip the skip input video frames F_2, F_3, F_5 rather than output all input video frames. By this way, the power consumption can be reduced. Additionally, in one embodiment the video frame transmitting method is applied to a touch control apparatus comprising a touch control panel. The touch control apparatus can be a mobile phone, a wearable device, a tablet, a television or any other electronic device being controlled by touch actions. The application processor 201 may determine a next one of the input video frame as the active input video frame if a user touches the touch control panel. For example, the user may touch the touch control panel at a time point t1, then the application processor 201 may determine a next input video frame F_6, which has content different from the content of the input video frame F_5 corresponding to the touch operation, as an active input video frame. Then the application processor 201 may output the input video frame F_6 accordingly. By this way, the delay issue for the display can be avoided. However, please note the input video frame which has content different from the content of the previous input video frame corresponding to the user's touch is not limited to an input video frame next to the user's touch.

Figure 8:
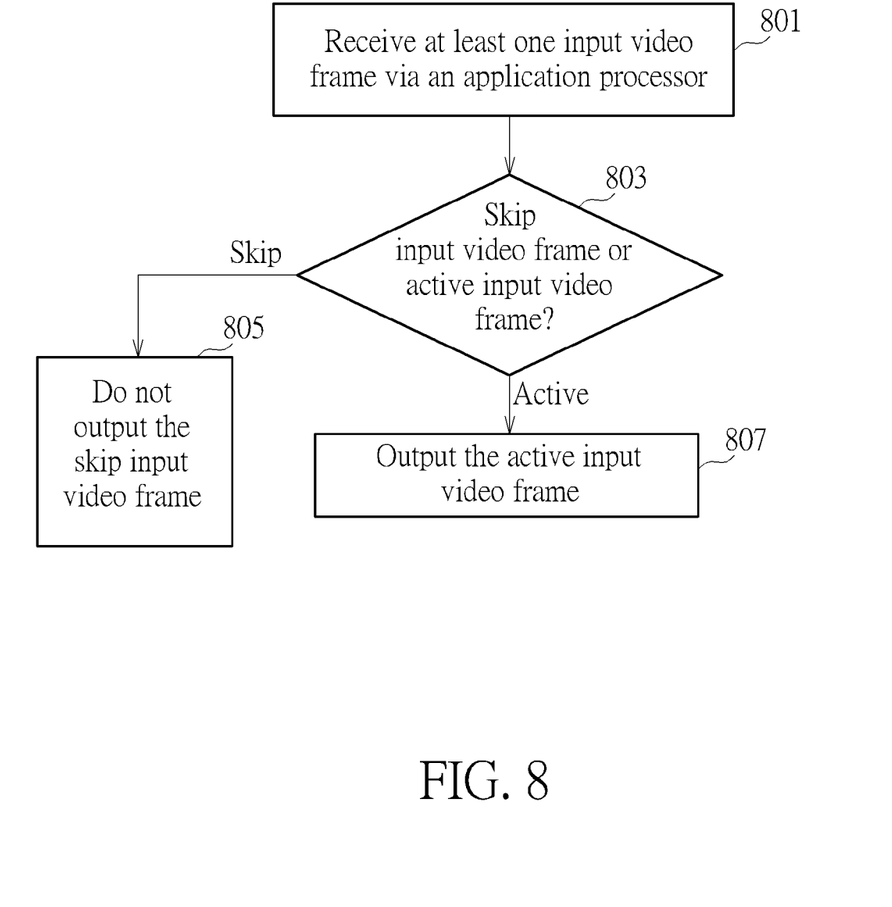
FIG. 8 is a flow chart illustrating a video frame transmitting method according to one embodiment of the present application.

In view of above-mentioned embodiments, a video frame transmitting method according to one embodiment of the present application can be acquired. FIG. 8 is a flow chart illustrating a video frame transmitting method according to one embodiment of the present application. The video frame transmitting method depicted in FIG. 8 can be applied to transmit at least one output video frame to a display (ex. display 205 in FIG. 2) based on content of at least one input video frame. The display may receive the output video frame from a display driver (ex. display driver 203 in FIG. 2). The display driver may receive at least one active input video frame and may output the active input video frame as the output video frame.

The video frame transmitting method in FIG. 8 comprises the following steps:

Step 801

Receive at least one input video frame via an application processor.

Step 803

Determine the input video frame as an active input video frame if the content of the input video frame is different from the content of a previous input video frame, and determine the input video frame as a skip input video frame if the content of the input video frame is the same as the content of a previous input video frame.

Step 805

Do not output the skip input video frame from the application processor.

Step 807

Output the active input video frame from the application processor.

In view of above-mentioned embodiments, the application processor can skip input video frames without a video frame buffer. Also, the delay issue for the display can be reduced, if an input video frame has different content from the content of a previous frame corresponding to the touch is determined as an active input video frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video frame transmitting system, for transmitting at least one output video frame to a display based on content of at least one input video frame, wherein the video frame transmitting system comprises a display driver for receiving an active input video frame and for outputting the active input video frame as the output video frame to the display, wherein the video frame transmitting system comprises:

an application processor, receiving the input video frame, for determining the input video frame as the active input video frame if the content of the input video frame is different from content of a previous input video frame, and for determining the input video frame as a skip input video frame if the content of the input video frame is the same as the content of the previous input video frame, wherein the application processor outputs the active input video frame to the display driver but does not output the skip input video frame.

2. The video frame transmitting system of claim 1, wherein the application processor comprises at least one data pin and at least one clock pin, wherein the application processor transmits the input video frame to the display driver via the data pin, and receives a transmitting clock signal via the clock pin, wherein the application processor transmits the active input video frame based on the transmitting clock signal, wherein the application processor controls the data pin and the clock pin to keep at a predetermined voltage level if the application processor does not output the skip input video frame.

3. The video frame transmitting system of claim 2,
wherein the application processor outputs the active input video frame in at least one active time period;
wherein the application processor does not output the skip input video frame in at least one skip time period;
wherein the application processor generates at least one vertical sync packet indicating start timing of the skip time period to the display driver, for the at least one skip time period.

4. The video frame transmitting system of claim 3, wherein the application processor generates at least one horizontal sync packet indicating each line of the skip input video frame to the display driver, for the at least one skip time period.

5. The video frame transmitting system of claim 2,
wherein the application processor outputs the active input video frame in at least one active time period;
wherein the application processor does not output the skip input video frame in at least one skip time period;
wherein the application processor generates at least one horizontal sync packet indicating each line of the skip input video frame to the display driver, for the at least one skip time period.

6. The video frame transmitting system of claim 1, applied to a touch control apparatus comprising a touch control panel, wherein the application processor determines the input video frame which is different from the previous input video frame corresponding to an user's touch for the touch control panel as the active input video frame.

7. The video frame transmitting system of claim 1, wherein the video frame transmitting system is based on a MIPI standard.

8. The video frame transmitting system of claim 1,
wherein the application processor outputs the active input video frame in at least one active time period;
wherein the application processor does not output the skip input video frame in at least one skip time period;
wherein a length of the skip time period equals to a length of a time period for transmitting the input video frame.

9. A video frame transmitting method, for transmitting at least one output video frame to a display based on content of at least one input video frame, wherein the display receives the output video frame from a display driver, wherein the display driver receives an active input video frame and outputs the active input video frame as the output video frame, wherein the video frame transmitting method comprises:
receiving the input video frame via an application processor, determining the input video frame as the active input video frame if the content of the input video frame is different from content of a previous input video frame, and determining the input video frame as a skip input video frame if the content of the input video frame is the same as the content of the previous input video frame; and
outputting the active input video frame from the application processor to the display driver but not outputting the skip input video frame from the application processor.

10. The video frame transmitting method of claim 9, wherein the application processor comprises at least one data pin and at least one clock pin, wherein the application processor transmits the input video frame to the display driver via the data pin, and receives a transmitting clock signal via the clock pin, wherein the video frame transmitting method comprises:
controlling the data pin and the clock pin to keep at a predetermined voltage level if not outputting the skip input video frame from the application processor.

11. The video frame transmitting method of claim 10, further comprising:
outputting the active input video frame in at least one active time period;
outputting the skip input video frame in at least one skip time period;
generating at least one vertical sync packet indicating start timing of the skip time period to the display driver, for the at least one skip time period.

12. The video frame transmitting method of claim 11, further comprising:
generating at least one horizontal sync packet indicating each line of the skip input video frame to the display driver, for the at least one skip time period.

13. The video frame transmitting method of claim 10, further comprising:
outputting the active input video frame in at least one active time period;
outputting the skip input video frame in at least one skip time period;
generating at least one horizontal sync packet indicating each line of the skip input video frame to the display driver, for the at least one skip time period.

14. The video frame transmitting method of claim 9, applied to a touch control apparatus comprising a touch control panel, wherein the video frame transmitting method further comprises:
determining the input video frame which is different from the previous input video frame corresponding to an user's touch for the touch control panel as the active input video frame.

15. The video frame transmitting method of claim 9, wherein the video frame transmitting method is based on a MIPI standard.

16. The video frame transmitting method of claim 9, further comprising:
outputting the active input video frame in at least one active time period;
outputting the skip input video frame in at least one skip time period;
wherein a length of the skip time period equals to a length of a time period for transmitting the input video frame.

* * * * *